United States Patent [19]
Feldman

[11] Patent Number: 4,590,620
[45] Date of Patent: May 20, 1986

[54] OPTICAL TELEPHONE

[76] Inventor: Nathan W. Feldman, 910 Van Court Ave., Elberon, N.J. 07740

[21] Appl. No.: 788,365

[22] Filed: Oct. 17, 1985

[51] Int. Cl.⁴ .................................................. H04B 9/00
[52] U.S. Cl. ..................................... 455/614; 455/619
[58] Field of Search ................ 455/614, 619; 181/0.5, 181/138, 140, 141; 367/150

[56] References Cited

U.S. PATENT DOCUMENTS

| | | | |
|---|---|---|---|
| 1,954,204 | 4/1934 | Hayes | 455/619 |
| 4,002,897 | 1/1977 | Kleinman et al. | 455/614 |
| 4,503,564 | 3/1985 | Edelman et al. | 455/614 |

FOREIGN PATENT DOCUMENTS 2639822 12/1977 Fed. Rep. of Germany ...... 455/614

*Primary Examiner*—Joseph A. Orsino, Jr.
*Attorney, Agent, or Firm*—Anthony T. Lane; Jeremiah G. Murray; Roy E. Gordon

[57] ABSTRACT

In an optical telephone wherein amplitude modulated light is converted to sound by applying the modulated light to an enclosed volume of gas wherein the volume and/or pressure of gas varies in synchronism with the instantaneous energy of the modulated light and wherein an optical fiber is used as the transmission element, the improvement is provided by the means to more uniformly distribute the optical energy in the gas cell causing an improved and more efficient conversion of the modulated light directly into sound.

The means can be provided by covering the light entering side with a positive lens and positioning the optical fiber at the focal point of the lens.

1 Claim, 1 Drawing Figure

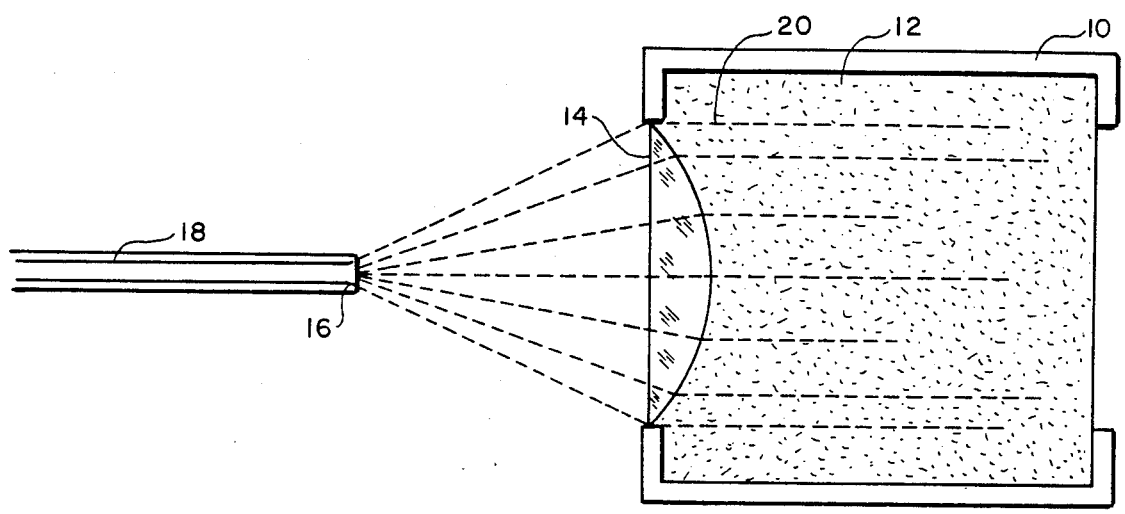

OPTICAL TELEPHONE

The invention described herein may be manufactured, used and licensed by or for the Government for governmental purposes without the payment to me of any royalty thereon.

BACKGROUND OF THE INVENTION

This invention relates to an improved optical telephone where an optical fiber is used as the transmission element.

In an optical telephone, it is required to convert amplitude modulated light to sound or mechanical energy. Most often, this is done by converting the modulated light into electrical energy and then amplifying and feeding it into an electromechanical transducer or earphone. In this invention, the modulated light is applied to an enclosed volume of gas. The volume and/or pressure of this gas varies in synchronism with the instantaneous energy or intensity of the modulated light. In this variation, the sounds are produced.

One of the difficulties encountered in an optical telephone where an optical fiber is used as the transmission element of modulated light is that optical energy is not uniformly transmitted into the enclosed volume of gas. This results in an inefficient conversion of the modulated light into sound.

SUMMARY OF THE INVENTION

The general object of this invention is to provide an improved optical telephone wherein an optical fiber is used as the transmission element. A further object is to provide such an improved optical telephone wherein means are provided for a more even distribution of modulated light in the gas and for a more efficient conversion of modulated light directly into sound.

It has now been found that the aforementioned objects can be obtained by covering the light entering side with a positive lens and positioning the optical fiber at the focal point of the lens. This procedure is found to more uniformly distribute the modulated light or optical energy in the gas cell causing an improved and more efficient conversion of the modulated light directly into sound.

It is believed that the invention works because parallel light rays, striking a positive lens, will converge at the focal point of the lens. Conversely, a point of light of about 50 microns in diameter placed at the focal point of the lens will cause substantially parallel rays to emerge. These parallel rays, so evenly distributed, being allowed to enter the opening of the gas cell will be more efficient and effective than the point source of the optical fiber itself.

DESCRIPTION OF THE DRAWING AND PREFERRED EMBODIMENT

The drawing is a schematic of a gas cell with means provided to more uniformly distribute the modulated light or optical energy in the gas cell causing an improved and more efficient conversion of the modulated light directly into sound.

Referring to the drawing, a gas absorption cell, 10, is shown containing a matrix of carbonized cotton fibers, 12, suspended in air. The light entering side of cell, 10, is covered with positive lens, 14. The positive lens 14 has a focal point, 16, at which optical fiber, 18, is positioned. When an input signal in the form of a modulated light beam is conducted by optical fiber, 18, to the focal point, 16, parallel rays, 20 are caused to emerge and enter the gas cell, 10. The parallel rays, 20, are more efficient and effective than the optical fiber, 18, itself can produce. The sound output of the cell, 10, is coupled to the small end of a long tapered acoustic tube (not shown).

Any other implementation of the above principle, that will produce parallel rays from a point source of light, are to be seen as coming within the scope of this invention.

I wish it to be understood that I do not desire to be limited to the exact details as described for obvious modifications will occur to a person skilled in the art.

What is claimed is:

1. In an optical telephone wherein amplitude modulated light is converted to sound by applying the modulated light to the light entering side of an enclosed volume of special gas contained in a gas absorption cell containing a matrix of carbonized cotton fibers suspended in air and wherein the volume of gas varies in synchronism with the instantaneous energy of the modulated light and wherein an optical fiber is used as the transmission element of the modulated light to the light entering side of the gas absorption cell, the improvement of covering the light entering side of the gas absorption cell with a positive lens and positioning the optical fiber at the focal point of the lens to more uniformly distribute the modulated light in the light entering side of the gas cell causing an improved and more efficient conversion of the modulated light directly into sound.

* * * * *